UNITED STATES PATENT OFFICE.

JOHN CUNINGHAME MONTGOMERIE, OF DALMORE, STAIR, SCOTLAND.

PROCESS OF EXTRACTING GOLD AND SILVER FROM ORES.

SPECIFICATION forming part of Letters Patent No. 524,602, dated August 14, 1894.

Application filed March 27, 1893. Serial No. 467,914. (No specimens.) Patented in England September 21, 1892, No. 16,894.

*To all whom it may concern:*

Be it known that I, JOHN CUNINGHAME MONTGOMERIE, a subject of the Queen of Great Britain and Ireland, of the Water of Ayr and Tam O'Shanter Hone Works, Dalmore, Stair, in the county of Ayr, Scotland, have invented a certain new and useful Improvement in the Extraction of Gold and Silver from Ores or Compounds Containing the Same, (for which I have obtained Letters Patent in Great Britain, No. 16,894, dated September 21, 1892,) of which the following is a specification.

This invention relates to the treatment of auriferous and argentiferous ores or compounds for the purpose of separating and collecting the gold and silver contained therein by means of solvent agents—as, for example, cyanide of potassium.

According to a method commonly employed in the recovery of gold and silver by means of cyanide of potassium, the ore or other material, having been reduced to a finely-triturated state, is placed, along with the solvent, in a barrel or other vessel, and is there subjected to agitation. After the lapse of a few hours, the contents of the barrel are removed to a filter, where the liquid portion of the charge (containing the precious metals in solution) is separated from the ore. The latter is further washed for the removal of any gold or silver remaining, in solution, therewith. The cyanide solution of gold and silver, as also the wash-water, is then treated for the recovery of the precious metals by precipitation in a zinc filter or percolator.

Where, in a process of the kind above referred to, cyanide of potassium is employed as the solvent agent, it is necessary for the ore to be neutralized before treatment; and in some cases, it is advantageous to render it more or less alkaline according to the nature of the ore, especially so where its treatment is effected in the presence of oxygen under pressure. With this object, sodium oxide ($Na_2O$) or caustic soda (NaOH) may be added, either before or with the solvent agent; the quantity best suited to the character of the ore being determined by experiment. Instead however of treating the mixture of ore, cyanide solution and sodium oxide in the presence of oxygen under pressure, I have found that equally satisfactory results may be obtained with atmospheric air instead of oxygen if sodium dioxide ($Na_2O_2$) be added to the mixture of ore and cyanide solution. In carrying out this operation, I take of cyanide of potassium a quantity proportionate to the ore to be treated and dissolve the same in a little water. I then take a small quantity of sodium oxide or caustic soda (say, three-fourths by weight of the cyanide), and having dissolved this also in a little water, I add the two solutions to the quantity of water appropriate for the charge of ore about to be treated. Before adding the ore to the mixture, I mix with the former the required quantity of sodium dioxide. This may be one third by weight of the sodium oxide. The compound is then added to the mixture before referred to and subjected to agitation, preferably in a closed vessel, in which case the oxygen gas evolved generates pressure. Additional air may also be forced in. By way of illustration, an ore containing, say, four ounces of gold and twelve ounces of silver to the ton may be treated with twelve pounds of cyanide, three pounds of sodium dioxide and nine pounds of sodium oxide.

I find that by adding a certain proportion of sodium oxide or caustic soda to the cyanide prior to the ore being added, the proportion of cyanide or other solvent, as also that of the sodium dioxide to be subsequently added, may be largely economized. In this way, moreover, I am enabled to mix the sodium dioxide with the ore; and, without any violent action taking place, it gradually becomes dissolved as the ore gets saturated with the water. I do not however confine myself to the precise sequence of operations or to the particular proportions hereinbefore mentioned, as these may be varied to a considerable extent for different kinds of ores and will be best determined by experiment. For dioxide of sodium, dioxide of potash or equivalent alkali, may be substituted; the same being applied under pressure of air or of oxygen, if preferred.

I also consider as within the scope of my invention a process for extracting gold and silver from ores wherein the use of sodium oxide is omitted, and the process consists in treating the gold and silver ores or compounds by means of a solvent such as a cyanide solvent, and an alkaline dioxide such as sodium dioxide, in the presence of oxygen or atmospheric air, under pressure. The use of oxygen under pressure is preferred, but broadly considered, atmospheric air is deemed the equivalent of oxygen.

When sodium dioxide is employed in the manner hereinbefore described, the mixture of ore and cyanide solution is not only rendered alkaline, but, by reason of the action of the dioxide upon the base metals and other impurities, a larger proportion of the cyanide is left free to act on the gold and silver, considerable economy resulting.

What I claim as my invention, and desire to secure by Letters Patent, is—

1. The improvement in the process of extracting gold and silver from ores or compounds by means of a solvent such as a cyanide solvent, consisting in treating the ore while in the presence of the solvent with an alkaline dioxide in the presence of oxygen, under pressure, substantially as herein described.

2. The improvement in the process of extracting gold and silver from ores or compounds by means of a cyanide or like solvent, consisting in treating the ore while in the presence of the solvent with an alkaline dioxide and an alkaline oxide, or its hydrate, substantially as herein described.

3. The improvement in the process of extracting gold and silver from ores or compounds by means of a cyanide, consisting in treating the ore while in the presence of the cyanide with sodium dioxide and sodium oxide or its hydrate.

4. The herein described improvement in the process of extracting gold and silver from ores or compounds by means of a cyanide or like solvent, consisting in treating the ore while in the presence of the solvent with an alkaline dioxide in conjunction with an alkaline oxide, or its hydrate under pressure of air or of oxygen.

JOHN CUNINGHAME MONTGOMERIE.

Witnesses:
   WM. THOS. MARSHALL,
   WM. V. BRACAN.
*Both of 2 Pope's Head Alley, Cornhill, London, E. C., Gentn.*